United States Patent [19]
Alliegro

[11] 4,138,456

[45] Feb. 6, 1979

[54] ARMOR STRUCTURE AND METHOD OF PRODUCING CERAMIC ARMOR

[75] Inventor: Richard A. Alliegro, Holden, Mass.

[73] Assignee: Norton Company, Worcester, Mass.

[21] Appl. No.: 677,737

[22] Filed: Oct. 24, 1967

[51] Int. Cl.$^2$ .......................................... C04B 35/64
[52] U.S. Cl. ................................................. 264/65
[58] Field of Search ................ 23/204, 208; 264/29, 264/56, 125, 332, 65

[56] References Cited

U.S. PATENT DOCUMENTS

| | | | |
|---|---|---|---|
| 3,013,862 | 12/1961 | May | 23/204 |
| 3,041,142 | 6/1962 | Van Der Beck et al. | 23/204 |
| 3,143,413 | 8/1964 | Krapf | 264/332 |
| 3,161,472 | 12/1964 | Scott | 23/208 A |
| 3,328,127 | 6/1967 | Byrns | 23/204 |
| 3,632,710 | 1/1972 | Jahn | 264/65 |

*Primary Examiner*—Brooks H. Hunt
*Attorney, Agent, or Firm*—Cushman, Darby & Cushman

[57] ABSTRACT

A process for simultaneously upgrading arc furnace crude production of titanium diboride, titanium carbide and mixtures thereof by reacting the carbon present therein with boron trioxide and titanium oxide or with titanium dioxide alone while simultaneously hot pressing the reactants whereby to densify the resulting plate to maximize its modulus of elasticity and modulus of rupture for use in armor constructions, to form a hard ceramic plate adapted to be integrated with a fiber glass layer in the fabrication of armor.

1 Claim, No Drawings

ARMOR STRUCTURE AND METHOD OF PRODUCING CERAMIC ARMOR

BACKGROUND OF THE INVENTION

Ceramic armor structures are well known as shown in the co-pending applications, assigned to the assignee of this application, Ser. Nos. 594,649 filed Nov. 14, 1966, and 665,669 filed Aug. 29, 1967. Such armor devices make use of a ceramic plate of alumina, silicon carbide, or preferably boron carbide adhesively bonded to a fiber glass backing. The ceramic plate is effective to shatter the hardened steel core of an armor piercing projectile to effectively spread the force over a relatively wide area. The fiber glass layer adhered to the rear side of the ceramic plate serves to absorb the kinetic energy released upon the impact of the shattered projectile against the hard ceramic facing. In order to defeat projectiles having armor piercing cores even harder than hardened steel, an improved hard facing is needed for this type of laminated armor structure.

BRIEF DESCRIPTION

In following my invention I react crude, incompletely reacted arc furnace titanium carbide or titanium diboride and mixtures thereof with titanium dioxide or boric acid and titanium dioxide, in the presence of free carbon to produce a plate of substantially completely reacted titanium carbide, titanium diboride or mixed carbide and diboride. When such reaction is performed under heat and pressure, nearly theoretically dense sheets of ceramic result that have an improved ability to defeat projectiles having armor piercing cores with a higher modulus of elasticity than projectiles made with a hardened steel core. Such projectiles have been fired against ceramic plates made into armor in following my invention and it has been demonstrated that the titanium carbide or titanium diboride plates formed of either substance or a mixture thereof, have the physical and mechanical properties to stop such projectiles.

In addition, it is a further feature of this invention to show how such plates can be made from relatively inexpensive raw materials such as arc furnace titanium carbide and titanium diboride crudes. Since the normal impurity in such crudes is free carbon, it is possible to react this carbon with the titanium oxide or titanium oxide and boric acid (boron oxide) as the case may be to upgrade the titanium carbide or titanium diboride or mixtures thereof to simultaneously produce a high purity completely dense ceramic plate. The process is performed in a graphite mold under heat and pressure so that the ultimate hot pressed plate has its theoretical density or is at least 95% nearly of such density.

DETAILED DESCRIPTION

In the preferred form of my invention titanium carbide arc furnace crude or titanium diboride arc furnace crude or mixtures thereof are used. Such materials may be obtained at a relatively low cost per pound compared with the high purity ceramics which it has heretofore been thought must be used for all ceramic armor plates, I have found that the arc furnace crudes are ideal for my purpose. It is well known that arc furnace titanium carbide usually contains a significant percentage of unreacted carbon and that arc furnace titanium diboride is usually deficient in boron in addition to containing unreacted carbon. My invention makes use of these known characteristics to effect the production of a substantially pure titanium carbide and/or titanium diboride in sheet form under conditions of heat and pressure such that the sheet is as dense as can be made.

Such sheets when laminated to a fiber glass or other strong but deformable backing in the known manner make an ideal armor structure because of the relatively high modulus of elasticity and modulus of rupture inherent in sheets of such ceramic materials. Armor structures fabricated with such ceramic facings have been found to have excellent ballistic merit ratings.

In practice the arc furnace crudes I use, are analyzed quantitatively to determine the amount of free carbon present. Then a stoichiometric reaction mixture is made in the case of titanium carbide with titanium oxide and for titanium diboride with boric acid. The stoichiometric mixture is then subjected to heat and pressure so that the titania and boric acid as the case may be are dissociated so that the metal phase can react with the free carbon to produce titanium carbide or titanium diboride in situ. When the metal phase reacts with some of the free carbon present in the mass oxygen is available and the remainder of the carbon reacts with the oxygen to produce carbon monoxide or carbon dioxide which leaves the reaction zone as a gas. As the reaction proceeds under pressure, self bonding of the ceramic takes place and the solid reaction products assist in achieving the desired densification of the final product. The ceramic plate is then cooled upon completion of the hot pressing operation and is ready to be laminated with a fiber glass backing.

I have fabricated such a ceramic plate for use in armor fabrications from arc furnace titanium carbide having a quantitative analysis showing a 76% titanium content, 19% combined carbon and 5% carbon, intimately mixed with a pure titanium dioxide component, resulting in a mixture of reactants having the following stoichiometric proportions:

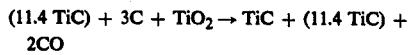

$$(11.4 \text{ TiC}) + 3\text{C} + \text{TiO}_2 \rightarrow \text{TiC} + (11.4 \text{ TiC}) + 2\text{CO}$$

The TiC in parentheses represents the non-reacting TiC in the mix. This mix was attained by crushing and blending 100 parts by weight of arc furnace crude titanium carbide with 11 parts of titanium dioxide.

Batches of such mixture, to form ceramic plates were placed in graphite molds about 14 inches diameter and 8 inches deep. Pressure 2500 psi was applied to the mixture in the mold and the temperature was raised to 2200° C. The pressure was continuously applied for a period of 1½ hours as the reaction proceeded and upon completion of the hot pressing operation the self-bonded substantially completely dense plate was 1 inch thick. The ceramic thus produced was found to have a density of 4.9 grams/cubic centimeter, a modulus of elasticity of 68 × 10$^6$ psi and a modulus of rupture of 45 × 10$^3$ psi.

Other plates have been made with a mixture of titanium diboride, boron trioxide and titania. The arc furnace crude gave a quantitative analysis of 64% titanium, 22% boron and 13% free carbon. A stoichiometric mixture for such a reaction has been prepared by blending 100 parts by weight of crude TiB$_2$ with 8.4 parts of TiO$_2$ and 46.0 parts of B$_2$O$_3$·3H$_2$O, the combined water being driven off of the boric acid before the B$_2$O$_3$ begins to dissociate as the temperature is raised during the reaction. Plates 15 inches square by 1 inch thick have been made by this hot pressing method in a graphite mold at a pressure of 2500 psi and a temperature of 2200° C. The hot pressing step was carried on for a period of 1½ hours. Such a plate will be found to have a density of from 4.45 grams per cubic centimeter compared with a theoretical density of 4.52 grams per cubic centimeter for $TiB_2$. The modulus elasticity of this product was found to be $80 \times 10^6$ psi and the modulus of rupture $50 \times 10^3$ psi.

Another plate was made from a stoichiometric mixture of crude $TiB_2$ and titania as a purifying additive. The same arc furnace crude titanium diboride described above was crushed and blended for this example and the resulting product was a self-bonded titanium diboride and titanium carbide mixture. Products made by this method to produce TiC, $TiB_2$ mixtures are found to have densities of 4.4 to 4.65 grams per cubic centimeter, a modulus of elasticity of $65-75 \times 10^6$ psi and a modulus of rupture of $35-55 \times 10^3$ psi. I have successfully hot pressed $Tib_2$/TiC plates $15 \times 15 \times 1$ inches in a graphite mold at a temperature of 2150°–2250° C. and a pressure of 1500–3000 psi for a period of 1–2 hours.

Similarly a combination plate of TiC and $TiB_2$ can be produced from a mixture of crude TiC with $TiO_2$ and $B_2O_3$, with added carbon if necessary. The products that are blended to form the desired reaction mixture are mixed in the form of crushed grains. The arc furnace crudes may be reduced to a range of screen sizes of 325 and finer mesh (Tyler screens) and the titanium dioxide powder conventionally used as a paint pigment may be used for my purposes. Any usual source of pure boric acid powder or boron trioxide will be found to be satisfactory for use in my invention.

Pressures in the range of from 1500 psi to 3000 psi can be used, but I prefer to operate at about 2500 psi. The hot pressing techniques used for producing dense refractory products are well known. I suggest that a temperature range of from 2150° C. to 2250° C. may be used, but generally for average sized pieces and normal powders 2200° C. is satisfactory.

Arc furnace crudes of titanium carbide and titanium diboride may vary considerably in the proportions of titanium present and also the percentage of free carbon. In certain instances it may even be desirable to add a few percent of free carbon to the mix in powder form in order to provide a reaction mixture that will combine with $TiO_2$ to produce TiC for bonding purposes and also to make the plate as nearly 100% dense as possible. By the techniques of this invention, compositions of 25–75% TiC combined with 75 to 25% $TiB_2$ may be produced. The arc furnace crudes which I consider to be useful for my purpose have a range of analyses as follows:

| TiC | | $TiB_2$ | |
| --- | --- | --- | --- |
| Ti | >75% (by wt.) | Ti | 54–70% (by wt.) |
| C (total) | >23% (by wt.) | C | 1–12% (by wt.) |
| C (free) | 4–6% (by wt.) | B | 19–33% (by wt.) |
| 0 | 0.5–3% (by wt.) | 0 | 0.5–3% (by wt.) |

To be an effective armor plate within the contemplation of this invention the modulus of elasticity should fall with the range of from $60 \times 10^6$ psi to $85 \times 10^6$ psi and the modulus of rupture from $30 \times 10^3$ psi to $65 \times 10^3$ psi.

The above describes the preferred form of my invention. It is suggested that many modifications thereof may occur to those skilled in the art which will fall within the scope of the following claims.

I claim:

1. A method of simultaneously upgrading a mixture of arc furnace $TiB_2$ crude and TiC crude, while forming a hot pressed shape therefrom comprising the steps of making a quantitative analysis of the arc furnace crude to determine the free carbon content thereof, blending $TiO_2$ and $B_2O_3$ in substantially stoichiometric amounts, and then hot pressing the blended mass to the desired shape at a temperature in the range of from about 2050° C. to about 2250° C., at a pressure of from about 1500 psi to about 3000 psi, to produce a hard, dense, ceramic shape of a mixture of substantially pure TiC and $TiB_2$.

* * * * *